United States Patent
Partsch et al.

(10) Patent No.: US 9,869,119 B2
(45) Date of Patent: Jan. 16, 2018

(54) SYSTEMS AND METHODS FOR OPERATING VEHICLE DOORS

(71) Applicant: Faraday&Future Inc., Gardena, CA (US)

(72) Inventors: Matthew R. Partsch, San Pedro, CA (US); Ryan B. Wonfor, Los Angeles, CA (US); Cian J. F. Brogan, Franklin, MI (US); Padmanabhan Kumar, Rancho Palos Verdes, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/057,066

(22) Filed: Feb. 29, 2016

(65) Prior Publication Data

US 2017/0247932 A1    Aug. 31, 2017

(51) Int. Cl.
*E05F 15/70* (2015.01)
*E05F 15/00* (2015.01)
*E06B 3/36* (2006.01)
*B60J 5/04* (2006.01)

(52) U.S. Cl.
CPC ............ *E05F 15/70* (2015.01); *B60J 5/0477* (2013.01); *E05F 15/00* (2013.01); *E06B 3/36* (2013.01); *E05Y 2400/44* (2013.01); *E05Y 2400/45* (2013.01); *E05Y 2900/50* (2013.01)

(58) Field of Classification Search
CPC ...... B60J 5/0477; B60J 5/0479; E05F 17/004; E05F 2017/008
USPC .............................. 49/142, 207, 371; 701/49
See application file for complete search history.

(56) References Cited

U.S. PATENT DOCUMENTS

| | | | | |
|---|---|---|---|---|
| 6,305,737 B1* | 10/2001 | Corder | .................. | B60J 5/0479 296/146.11 |
| 6,979,046 B2* | 12/2005 | Moriyama | ............. | B60J 5/0479 16/366 |
| 7,488,029 B2* | 2/2009 | Lechkun | ................ | B60J 5/0479 296/146.1 |
| 8,484,900 B2* | 7/2013 | Charnesky | ............. | B60J 5/0479 296/146.9 |
| 8,740,284 B2* | 6/2014 | Freymann | .............. | B60J 5/0479 296/146.4 |
| 8,838,333 B2* | 9/2014 | Cheal | ....................... | B60J 5/103 296/146.8 |
| 9,026,313 B2* | 5/2015 | Eggeling | .................. | B60J 5/103 292/201 |

(Continued)

*Primary Examiner* — Katherine Mitchell
*Assistant Examiner* — Catherine A Kelly
(74) *Attorney, Agent, or Firm* — Finnegan, Henderson, Farabow, Garrett & Dunner (57) ABSTRACT

A system for closing carriage doors of a vehicle may include first and second carriage doors configured to open and close via respective first and second actuators. The system may also include a controller configured to receive signals indicative of angles of the first and second doors relative to closed positions. The controller may also be configured to determine respective first and second velocity profiles for the first and second carriage doors based on the angles of the first and second doors. In addition, the controller may be configured to control operation of at least one of the first and second actuators based on the first and second angles, such that the first carriage door and the second carriage door stay farther apart from one another than a predetermined threshold distance while closing.

19 Claims, 6 Drawing Sheets

(56) References Cited

U.S. PATENT DOCUMENTS

| | | | |
|---|---|---|---|
| 2006/0087272 A1* | 4/2006 | Matsuyama | E05F 15/73 318/466 |
| 2015/0105983 A1* | 4/2015 | Cheal | B60J 5/103 701/49 |
| 2015/0224859 A1* | 8/2015 | Warburton | B60J 5/103 701/49 |
| 2016/0123061 A1* | 5/2016 | Nishikibe | E05F 15/632 701/49 |

* cited by examiner

SYSTEMS AND METHODS FOR OPERATING VEHICLE DOORS

TECHNICAL FIELD

The present disclosure generally relates to systems and methods for operating vehicle doors.

BACKGROUND

A vehicle door is usually equipped with a handle. Such a handle is often located below the outer belt line of the door and allows people to manually open the doors. Although this arrangement may be easy to implement, there are some shortcomings. For example, an operator may open and close a door very quickly, which may cause damage to an operator located between an open door and a vehicle. For example, the operator may pinch a finger. Due to safety concerns, undesirable design choices are sometimes made when vehicle doors are manually operated. Therefore, it may be desirable to add safety functionality to the doors of a vehicle.

Doors that open and close automatically, also referred to as powered doors, may not require a user to pull or push them open, and instead may rely on one or more actuators to open and close the door. Sometimes, when an actuator is opening or closing a door there may be an undesirably small amount of clearance between the edge of the door and other parts of the vehicle, such as an adjacent door. Therefore, it may be desirable to control operation of one or more actuators such that there is more clearance between the closing door and other parts of the vehicle.

SUMMARY

One aspect of the present disclosure is directed to a system for closing carriage doors of a vehicle. The system may include a first carriage door configured to be opened and closed via a first actuator relative to a side of the vehicle on which the first carriage door is attached. The system may also include a second carriage door configured to be opened and closed via a second actuator relative to the side of the vehicle on which the second carriage door is attached. The system may also include a controller configured to receive signals indicative of a first angle relative to the side of a vehicle at which the first carriage door is oriented. The controller may also be configured to receive signals indicative of a second angle relative to the side of the vehicle at which the second carriage door is oriented. In addition, the controller may be configured to determine a first velocity profile for the first carriage door based on the first angle and the second angle. The controller may also be configured to determine a second velocity profile for the second carriage door based on the first angle and the second angle. Moreover, the controller may be configured to control operation of at least one of the first and second actuators based on the first and second angles, such that the first carriage door and the second carriage door stay farther apart from one another than a predetermined threshold distance while closing.

One aspect of the present disclosure is directed to a method for closing carriage doors of a vehicle. A controller may determine a first angle. The first angle may be an angle at which a first carriage door is opened relative to a side of the vehicle on which the carriage doors are attached. The controller may determine a second angle. The second angle may be an angle at which a second carriage door is opened relative to the side of the vehicle on which the carriage doors are attached. The controller may determine a velocity profile for the first carriage door based on the first angle and the second angle. The controller may also determine a velocity profile for the second carriage door based on the first angle and the second angle. In addition, the controller may control the operation of at least one of a first actuator configured to close the first carriage door and a second actuator configured to close the second carriage door based on the first and second angles, such that the first carriage door and the second carriage door stay farther apart from one another than a predetermined threshold distance while closing.

Yet another aspect of the present disclosure is directed to a non-transitory computer-readable medium storing instructions that, when executed, cause one or more processors to perform a method for closing carriage doors of a vehicle. The method may include determining, via a controller, a first angle that is an angle at which a first carriage door is opened relative to a side of the vehicle on which the first carriage door is attached. The method may also include determining, via the controller, a second angle that is an angle at which the second carriage door is opened relative to the side of the vehicle on which the second carriage door is attached. The method may include determining, via the controller, a velocity profile for the first carriage door based on the first angle and the second angle. The method may also include determining, via the controller, a velocity profile for the second carriage door based on the first angle and the second angle. The method may also include controlling, via the controller, operation of at least one of a first actuator configured to close the first carriage door and a second actuator configured to close the second carriage door based on the first and second angles, such that the first carriage door and the second carriage door stay farther apart from one another than a predetermined threshold distance while closing.

DETAILED DESCRIPTION

The disclosure is directed to a system and method for closing carriage doors of a vehicle. The vehicle on which the system and method may be implemented, may be an electric vehicle, a fuel cell vehicle, a hybrid vehicle, a conventional internal combustion engine vehicle, or combinations thereof. The vehicle may have any body style, such as a sports car, a coupe, a sedan, a pick-up truck, a station wagon, a sports utility vehicle (SUV), a minivan, or a conversion van. The vehicle may be configured to be operated by an operator, occupying the vehicle, or remotely controlled, and/or it may be autonomous.

In some embodiments, the system may be configured to close carriage doors of a vehicle such that the carriage doors stay farther apart from one another than a predetermined threshold distance while closing. As used herein, "predetermined" may refer broadly to a selection or calculation made any time prior to a time at which the adjacent edges of the carriage doors approach one another or are at orientations resulting in the adjacent edges defining a minimum distance there between. This includes a time corresponding to the design stage of the system and/or a time during a real-time calculation made during movement of the carriage doors.

Carriage doors are sometimes referred to as coach doors or rear-hinged doors. Typically carriage doors include a front door that is connected at its leading edge to a hinge near the front portion of the vehicle (e.g., at the A-pillar), and a rear door that, rather being connected to a hinge adjacent the trailing edge of the front door or near the B-pillar, is connected to a hinge near the trailing edge of the rear door or near the rear portion of the vehicle (e.g., at the C-pillar).

As described above, when carriage doors close, the adjacent edges of the doors remote from the hinged edges may come close together, potentially creating a clearance problem. In some embodiments described in the present disclosure, when powered doors close, rather than close at the same time and/or at the same pivot rate such that the adjacent edges come closer together than desired, at least one of the carriage doors may slow its pivot rate and/or stop such that one of the doors closes before the other door. This may prevent the adjacent edges of the doors from being undesirably close together when closing at the same time.

In some embodiments described herein, a velocity profile may be generated for each carriage door relative to the pivot rate of each carriage door during opening and/or closing. The velocity profile may relate to the pivot rate at which the associated door moves based on, for example, the angle at which the door has pivoted relative to the door being closed. For example, a controller may determine angles at which the carriage doors are opened in relation to a side of the vehicle to which the doors are coupled, and velocity profiles may be determined based on those angles, and a speed at which the doors close may be based on the angles. The velocity profiles for the respective carriage doors may result in the carriage doors closing at substantially similar velocities, until the doors approach the closed position, at which point the rate of closure of one of carriage doors may be reduced, such that the other door may continue to close according to its normal rate without the adjacent edges of the doors being closer to one another than a certain distance. In some embodiments, sensors located on the doors, pillars, hinges, and/or other portions of a vehicle may be used to determine the angles at which the doors are open.

In some embodiments, carriage doors that are opened at different angles may close based on which door is closest to being in a closed position (e.g., a door that is open at an angle less than the other door may close first). For example, a door that is opened at a thirty degree angle relative to the side of a vehicle may close before a door that is opened at a sixty degree angle in response to a controller receiving signals to close the doors. In some embodiments, when doors are opened at different angles, the doors may close at a substantially same closure rate into a closed position and not come within a predetermined threshold distance of each other.

Figure 1:
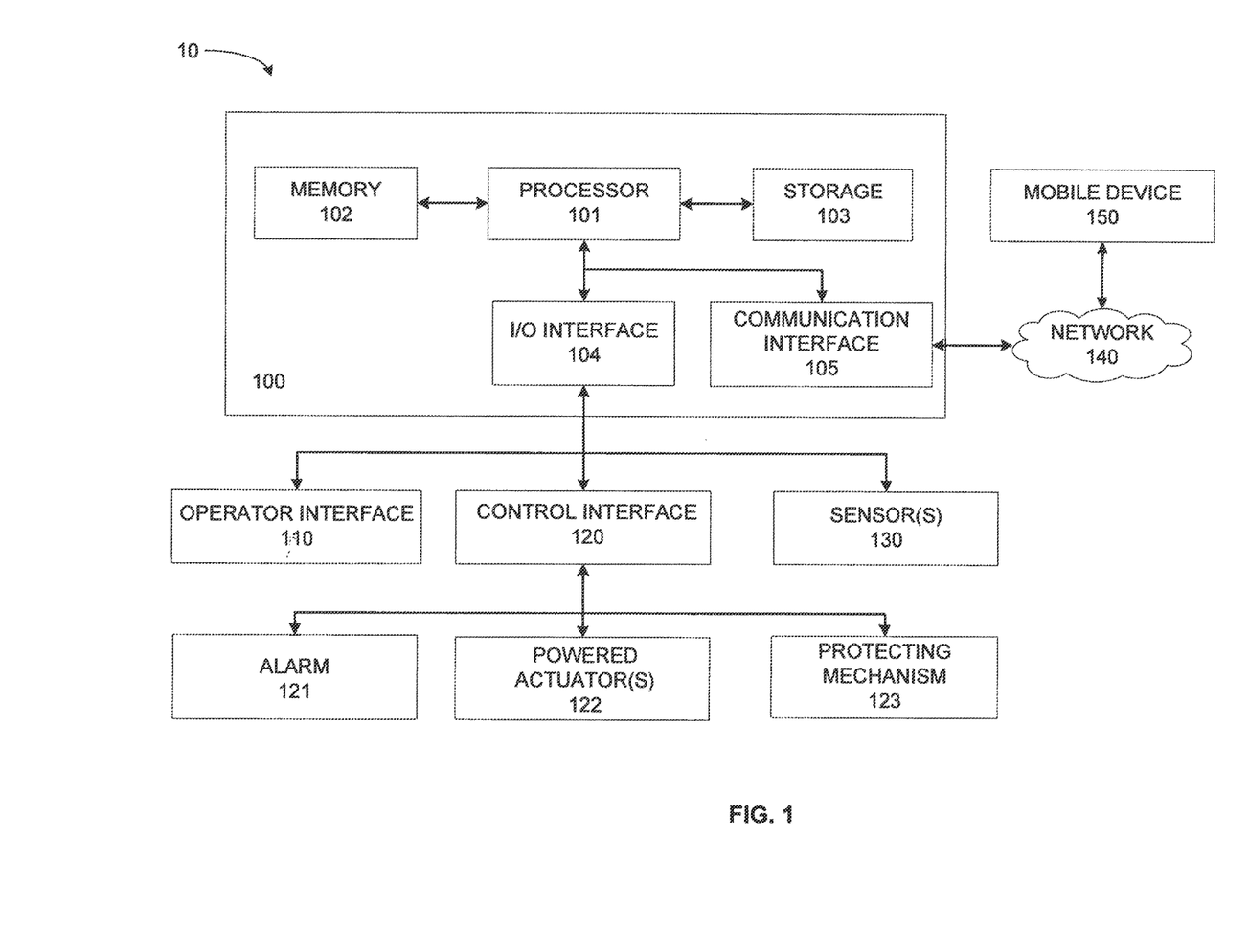
FIG. 1 is a block diagram of an exemplary embodiment of a system for opening and closing a vehicle door.

FIG. 1 shows a block diagram of an exemplary system 10 for opening or closing carriage doors on a vehicle. As illustrated in FIG. 1, system 10 may include a controller 100, an operator interface 110, a control interface 120, and one or more sensors 130. System 10 may also include an alarm 121 configured to generate an audio, visual, and/or display alert under certain circumstances, such as when the doors are closing or when the adjacent edges of the doors are within a particular distance of one another. System 10 may further include one or more actuators 122 configured to open or close the doors of the vehicle. In some embodiments, actuator(s) 122 may be powered. Actuators 122 may be one of a linear actuator or a motor configured to cause a door to move to a destination position determined by controller 100. For example, actuators 122 may be electrically, hydraulically, and/or pneumatically powered. Other types of actuators are contemplated. In some embodiments, system 10 may also include a protecting mechanism 123 configured to resist movement of the doors under certain circumstances, such as when adjacent edges of the doors approach or come within a particular distance of one another.

Controller 100 may have, among other things, a processor 101, memory 102, storage 103, an I/O interface 104, and/or a communication interface 105. At least some of these components of controller 100 may be configured to transfer data and send or receive instructions between or among each other. At least some of these components of controller 100 may be configured to generate a velocity profile for movement of each of the doors.

Processor 101 may be configured to receive signals from components of system 10 and process the signals to determine one or more conditions of the operations of system 10. Processor 101 may also be configured to generate and transmit a control signal to actuate one or more components of system 10. For example, processor 101 may determine a velocity profile, for example, by determining the respective positions (e.g., angles) of the doors relative to the side of the vehicle using one or more sensors 130. Processor 101 may also generate various portions of a velocity profile that may generate the control signal. For example, processor 101 may generate portions of a velocity profile based on various inputs such as a first door angle, a second door angle, and instructions stored in controller 100 that specify when, and by how much, one of the doors decreases in velocity when closing such that one of the doors closes before the other. Using these inputs, processor 101 may be used to determine a maximum velocity for each door while closing, a ramp-down time for each door (e.g., an amount of time in which a door's velocity is reduced), and a time to begin ramping down (e.g., a time at which one of the doors slows down to prevent the doors from coming within a particular distance from one another, such as a predetermined threshold distance).

In operation, according to some embodiments, processor 101 may execute computer instructions (program codes) stored in memory 102 and/or storage 103, and may perform exemplary functions in accordance with techniques described in this disclosure. Processor 101 may include or be part of one or more processing devices, such as, for example, a microprocessor. Processor 101 may include any type of a single or multi-core processor, a mobile device, a microcontroller, a central processing unit, a graphics processing unit, etc.

Memory 102 and/or storage 103 may include any appropriate type of storage provided to store any type of information that processor 101 may use for operation. Memory 102 and storage 103 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 102 and/or storage 103 may also be viewed as what is more generally referred to as a "computer program product" having executable computer instructions (program codes) as described herein. Memory 102 and/or storage 103 may be configured to store one or more computer programs that may be executed by processor 101 to perform exemplary functions disclosed in this application. Memory 102 and/or storage 103 may be further configured to store data used by processor 101. For example, memory 102 and/or storage 103 may be configured to store parameters for controlling one or more actuators 122, including, for example, the speed at which each door closes based on the angular position of the doors when at least one of the doors is open. In some embodiments, memory 102 and/or storage 103 may also be configured to store instructions for determining which door should close first based on the angular positions at which the doors are open and/or based on a threshold distance. Memory 102 and/or storage 103 may also be configured to store the inputs used by processor 101 in determining velocity profiles as described herein. For example, memory 102 and/or storage 103 may store a target velocity at which the doors should close, and/or a target velocity at which the doors move when nearing a closed condition (e.g., how fast the doors move when they are at or less than a 1, 2, 3, 4, 5, 10, 15, 20, 25, or 30 degree angle relative to a side of the vehicle). Memory 102 and/or storage 103 may also store information acquired by one or more sensors 130, the angle of a first door relative to the side of the vehicle, and the angle of a second door relative to the side of the vehicle.

I/O interface 104 may be configured to facilitate communication between controller 100 and other components of system 10. I/O interface 104 may also receive signals from one or more sensors 130, and send the signals to processor 101 for further processing. I/O interface 104 may also receive one or more control signals from processor 101, and send the signals to control interface 120, which may be configured to control the operations of one or more sensors 130, one or more actuators 122, protecting mechanism 123, and/or alarm 121. In some embodiments, I/O interface 104 may be configured to receive parameters associated with generating a velocity profile, such as a minimum distance (e.g., a minimum predetermined threshold distance) that the adjacent edges of the doors may be apart from one another, and/or a total time it takes for a door to close.

Communication interface 105 may be configured to transmit and receive data with, among other devices, one or more mobile devices 150 over a network 140. For example, communication interface 105 may be configured to receive from mobile device 150 a signal indicative of closing and/or locking a door. Communication interface 105 may also transmit the signal to processor 101 for further processing.

Operator interface 110 may be configured to generate a signal for locking, unlocking, opening, or closing the door in response to an action by an operator (e.g., a driver, a passenger, or an authorized person who can access the vehicle or open or close the vehicle door). Exemplary action by the operator may include a touch input, gesture input (e.g., hand waving, etc.), a key stroke, a force, a sound, speech, face recognition, a finger print, a hand print, or the like, or a combination thereof. In some embodiments, operator interface 110 may also be configured to activate or deactivate the vehicle in response to the operator's action. Operator interface 110 may also generate a signal based on the operator's action, and transmit the signal to controller 100 for further processing.

Operator interface 110 may be located on the interior side of the door and/or other component(s) inside the vehicle. Operator interface 110 may be part of or located on the exterior of the vehicle, such as, for example, an outer belt, an A-pillar, a B-pillar, a C-pillar, and/or a tailgate. Additionally or alternatively, operator interface 110 may be located on the interior side of the door and/or other component(s) inside the vehicle. For example, operator interface 110 may be part of or located on the steering wheel, the control console, and/or the interior side of the door (not shown). In some embodiments, operator interface 110 may be located on or within parts connecting the door and the locking mechanism of the vehicle. Operator interface 110 may sense a force pushing the door exerted by the operator inside or outside the vehicle, and generate a signal based on the force. For example, operator interface 110 may include a pull handle, a button, a touch pad, a key pad, an imaging sensor, a sound sensor (e.g., microphone), a force sensor, a motion sensor, or a finger/palm scanner, or the like, or a combination thereof.

Control interface 120 may be configured to receive a control signal from controller 100 for controlling, among other devices, sensor(s) 130, alarm 121, actuator(s) 122, and/or protecting mechanism 123. Control interface 120 may also be configured to control sensor(s) 130, alarm 121, actuator(s) 122, and/or protecting mechanism 123 based on the control signal.

Sensor 130 may be located on the exterior of the door or vehicle, the interior side of the door, or inside the vehicle. Sensor 130 may include one or more sensors configured to determine the angular position of one or more doors and/or a distance between adjacent edges of the carriage doors. In some embodiments, sensors 130 may be configured to emit light such as visible, UV, IR, RADAR, LiDAR, and other useful frequencies for irradiating the surface of the surrounding object(s) and measuring the distance of such object(s) from the door based on the reflected light received. In some embodiments, sensors 130 may include an ultrasonic sensor configured to emit ultrasonic signals and detect object(s) based on the reflected ultrasonic signals. Other types of sensors for determining the distance between portions of a vehicle are contemplated.

According to some embodiments, mobile device 150 may be configured to generate a signal indicative of activating or deactivating the vehicle. In some embodiments, mobile device 150 may be configured to generate a signal indicative of locking, unlocking, opening, or closing a door in response to the operator's input. For example, mobile device 150 may transmit the signal to system 10 over network 140. Network 140 may be any type of wired or wireless network that may allow transmitting and receiving data. For example, network 140 may be wired, a local wireless network (e.g., Bluetooth™, WiFi, near field communication (NFC), etc.), a cellular network, or the like, or a combination thereof. Other network types are contemplated.

Mobile device 150 may be any type of a general purpose computing device. For example, mobile device 150 may include a smart phone with computing capacity, a tablet, a personal computer, a wearable device (e.g., Google Glass™ or smart watches, and/or affiliated components), or the like, or a combination thereof. In some embodiments, a plurality of mobile devices 150 may be associated with selected persons. For example, mobile devices 150 may be associated with the owner(s) of the vehicle, and/or one or more authorized people (e.g., friends or family members of the owner(s) of the vehicle).

Figure 2:
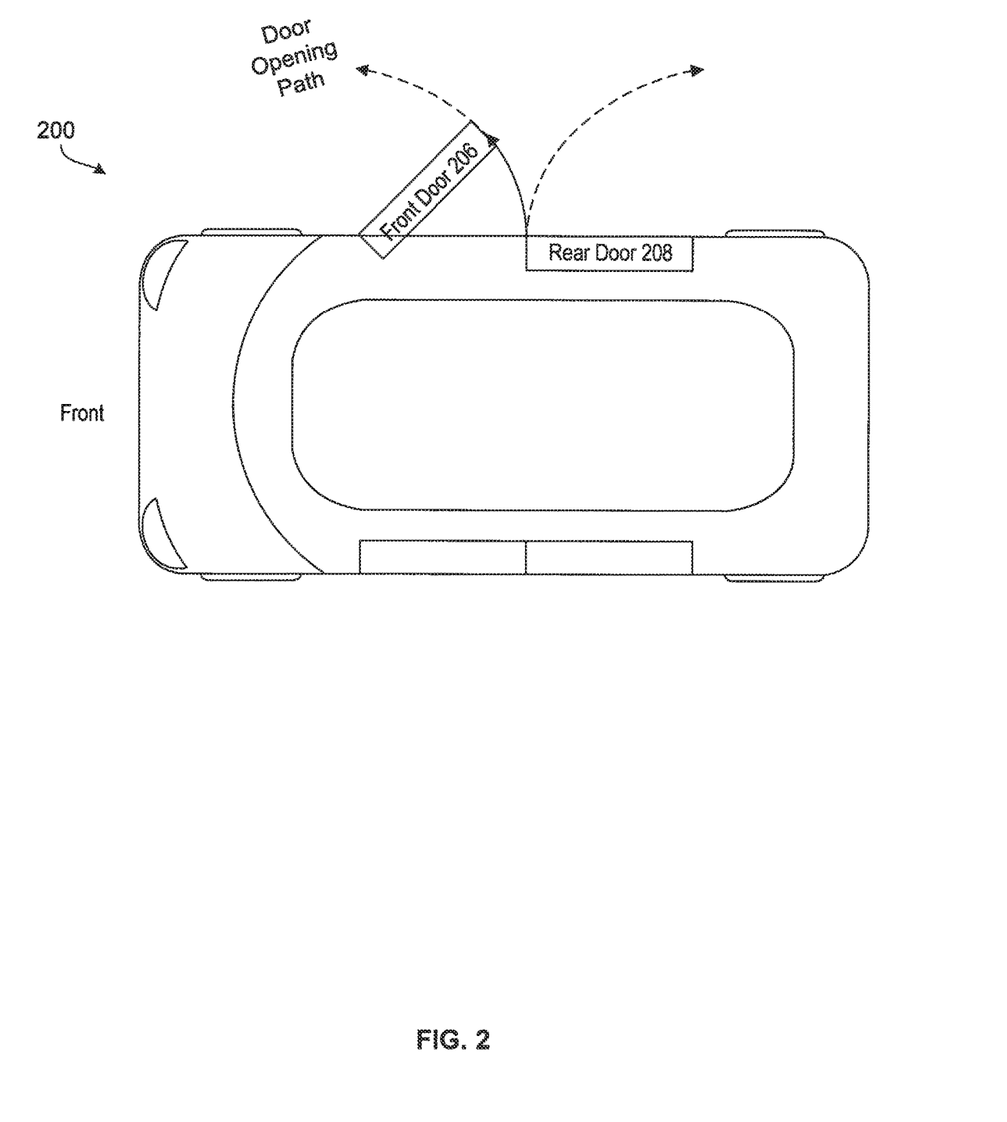
FIG. 2 is a schematic top view of an exemplary embodiment of a vehicle configured to implement the exemplary system of FIG. 1.

FIG. 2 is a schematic top view of an exemplary embodiment of a vehicle 200 configured to implement the exemplary system of FIG. 1. Exemplary vehicle 200 includes carriage doors including a front door 206 and a rear door 208. Carriage doors 206 and 208 may pivot to open from a closed position along a path such that the adjacent edges move through an arc away from one another. In some embodiments, a velocity profile may be provided by a controller 100 and used to determine the respective pivot speeds at which carriage doors 206 and 208 open. In some embodiments, front door 206 may move at an angular velocity when opening that is different than the angular velocity of rear door 208 when opening. According to some embodiments, front door 206 may open to a different angle relative to the side of the vehicle than rear door 208.

Figure 3:
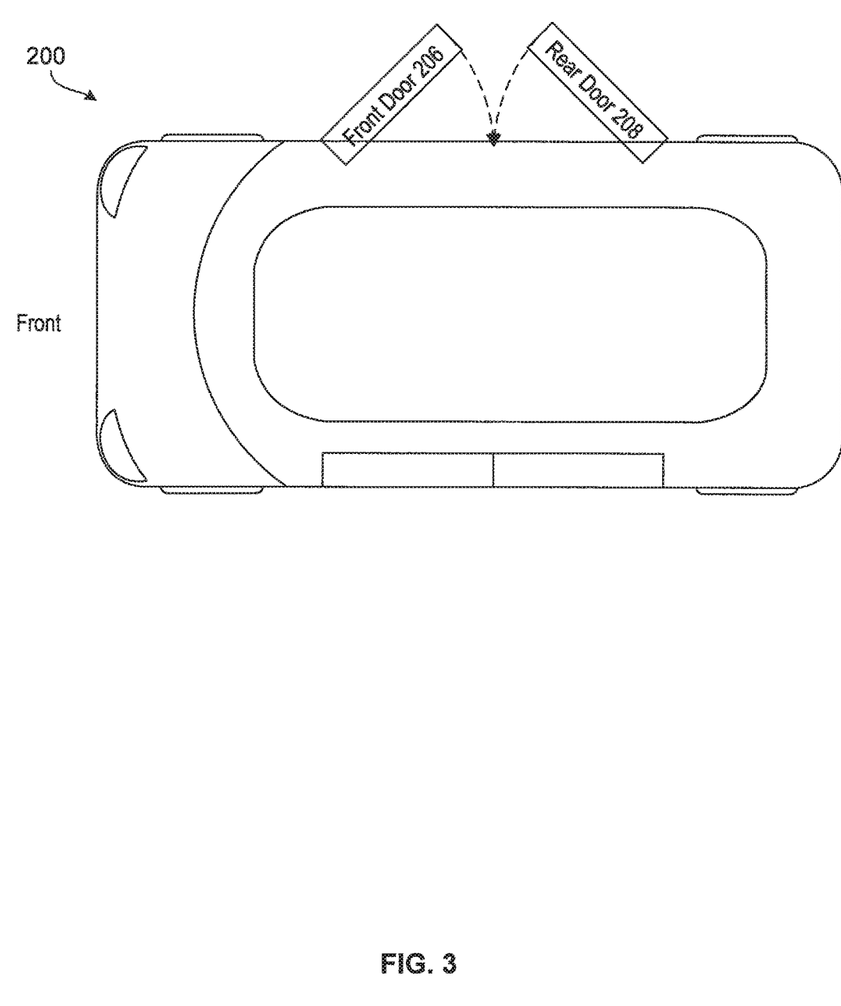
FIG. 3 is a schematic top view of an exemplary embodiment of a vehicle configured to implement the exemplary system of FIG. 1.

FIG. 3 is a schematic top view of an exemplary embodiment of vehicle 200 configured to implement the exemplary system of FIG. 1. Vehicle 200 in FIG. 3 also includes carriage doors 206 and 208 that may move into a closed position such that adjacent edges move toward each other. In some embodiments, if front door 206 is open at an angle that is substantially the same as an angle at which rear door 208 is open, the doors may close at substantially the same angular speed until the adjacent edges approach one another (e.g., they reach a predetermined threshold distance from one another, which may be determined by the angles at which the doors are positioned). In some embodiments, carriage doors 206 and 208 may close and become closer than a predetermined threshold distance (e.g., 2, 2.5, or 3 millimeters from one another). Alternatively, carriage doors 206 and 208 (e.g., adjacent edges of carriage doors 206 and 208) may be prevented from becoming closer than the predetermined threshold distance from one another. As described above, a predetermined threshold distance may be stored in memory 102 and/or storage 103, and used to create a velocity profile for one or more doors 206 and 208.

Figure 4:
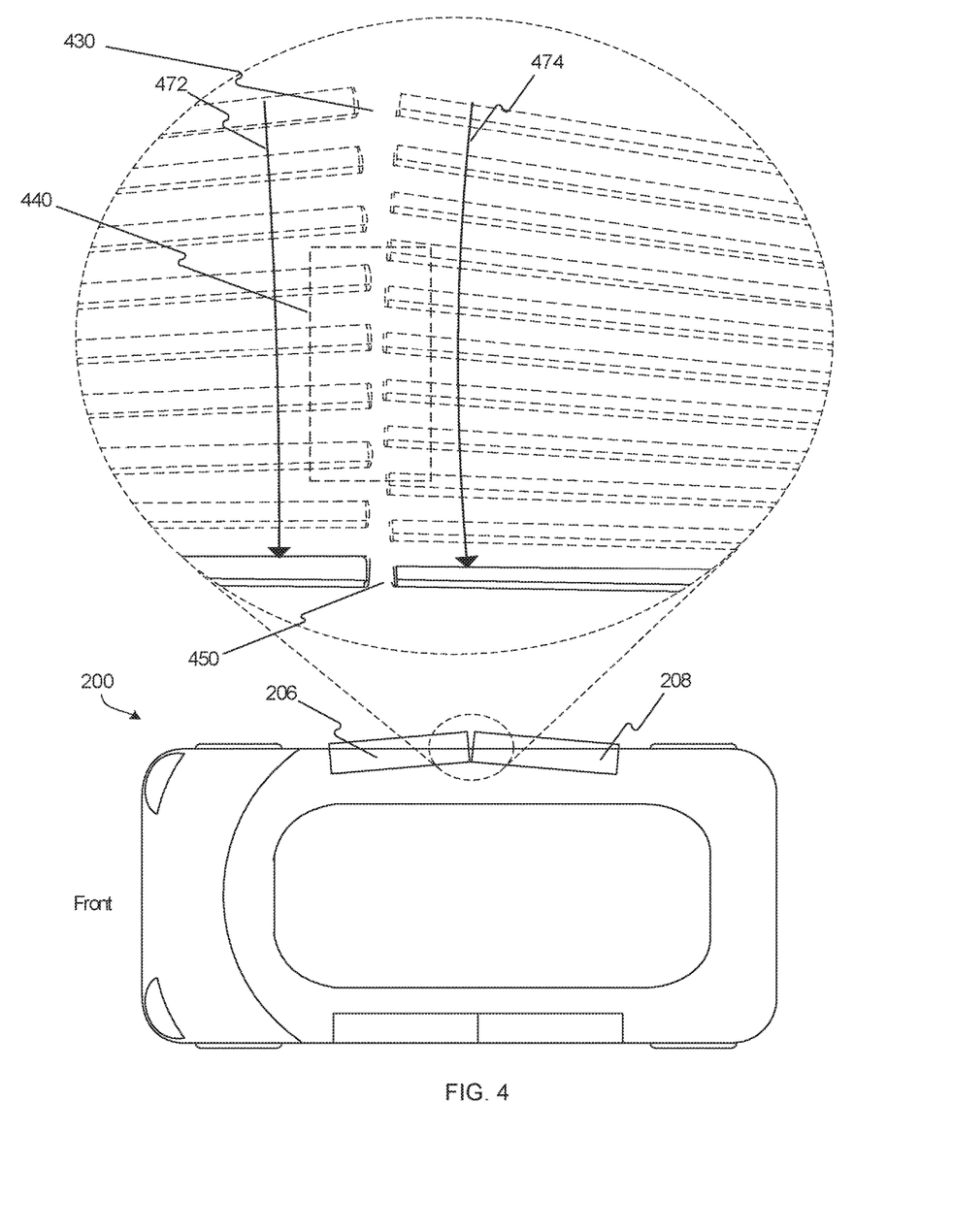
FIG. 4 is a schematic top view of an exemplary embodiment of a vehicle configured to implement the exemplary system of FIG. 1.

FIG. 4 is a schematic top view of an exemplary embodiment of vehicle 200 configured to implement the exemplary system of FIG. 1. Vehicle 200 in FIG. 4 also includes exemplary carriage doors 206 and 208. In addition, FIG. 4 includes a detailed view of the space between carriage doors 206 and 208 when the adjacent edges are close to each other. The detailed view shows carriage doors 206 and 208 in multiple positions, in which the lowest positions shown in FIG. 4 correspond to closed positions for doors 206 and 208. It should be appreciated that an entire width of a door is not shown in the detailed view of carriage doors 206 and 208 in FIG. 4, and instead a portion of a belt seal (e.g., the outermost portion of a door relative to the interior of vehicle 200) is shown. At the closed position, adjacent edges of front door 206 and rear door 208 may be separated by a closed-position distance 450. Due to the manner in which carriage doors 206 and 208 open and close and their thickness, when they are slightly open at the same angle (e.g., 4, 4.5, or 5 degrees), adjacent edges of doors 206 and 208 may be positioned slightly closer together (e.g., at a distance less than three millimeters) relative to closed-position distance 450. When doors 206 and 208 are in a position having a larger angle, an open-position distance 430 between adjacent edges of carriage doors 206 and 208 may be larger. In some embodiments, closed-position distance 450 and open-position distance 430 may be larger than a predetermined threshold distance, which may correspond to an area 440 surrounded in FIG. 4 by a dashed line in the shape of a rectangle. For example, area 440 may include positions that adjacent edges of carriage doors 206 and 208 are located at when the distance between adjacent edges of carriage doors 206 and 208 is less than a predetermined threshold distance. As described above, in some embodiments, carriage doors 206 and 208 may close in a manner, such that they do not come closer to one another than the predetermined threshold distance (e.g., 2 millimeters, 2.5 millimeters, 3 millimeters, or less).

Figure 5:
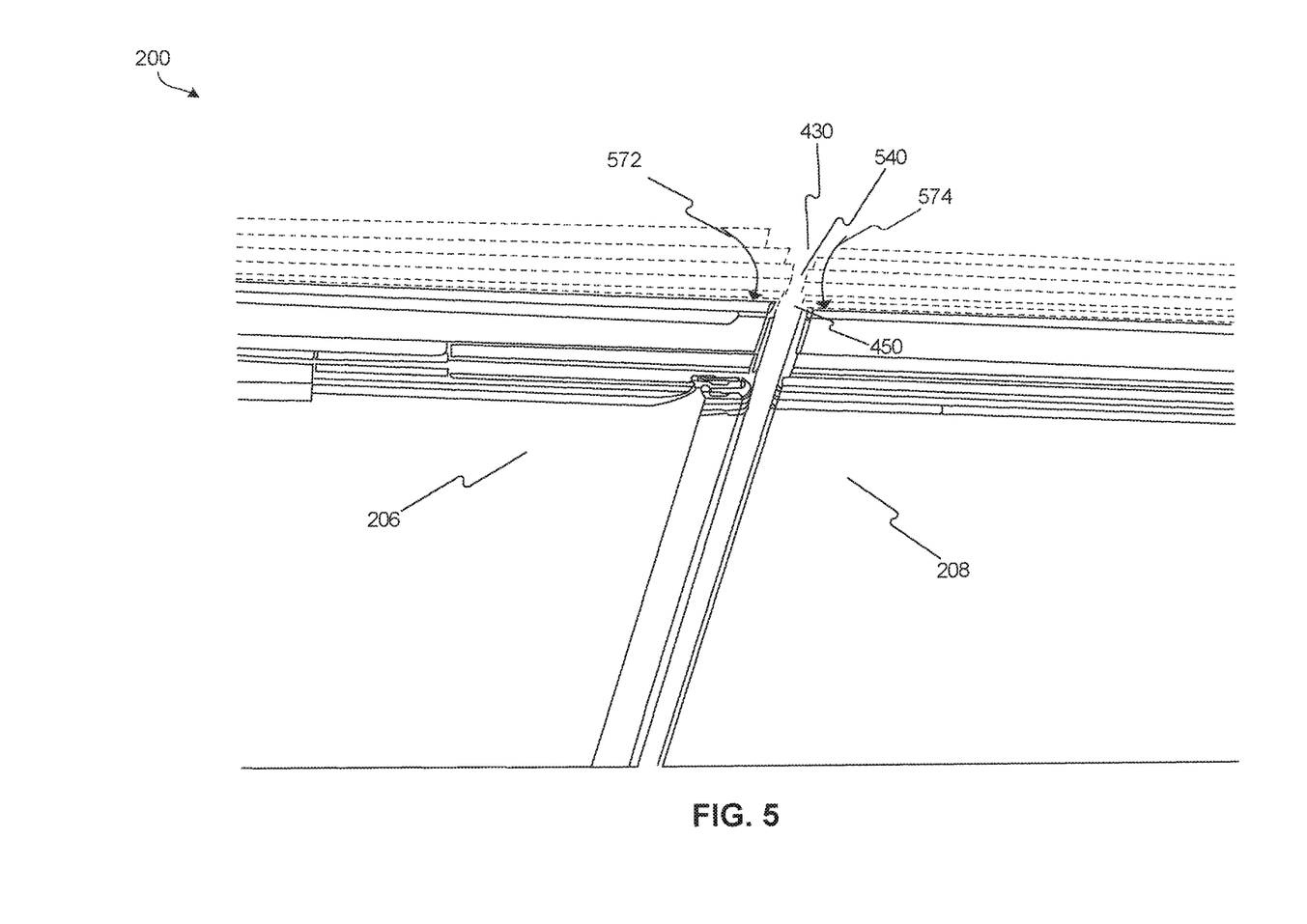
FIG. 5 is a schematic top view illustrating a plurality of positions of carriage doors over a range of orientation angles relative to the side of an exemplary vehicle in conjunction with the exemplary system of FIG. 1.

FIG. 5 is a schematic top view illustrating a plurality of positions of carriage doors over a range of orientation angles relative to the side of an exemplary vehicle in conjunction with the exemplary system of FIG. 1. As with FIG. 4, FIG. 5 shows carriage doors 206 and 208 in a plurality of positions including a closed position with a closed-position distance 450, a slightly open position with an open-position distance 430, and an intermediate position where the adjacent edges of doors 206 and 208 are closer to one another than a threshold distance 540. In some embodiments, each position of carriage doors 206 and 208 shown in FIG. 5 may have the same angular difference between one another. For example, each of the angular door positions shown in FIG. 5 may correspond with carriage doors 206 and 208 being half a degree more open or closed than the position above or below it, respectively.

Figure 6:
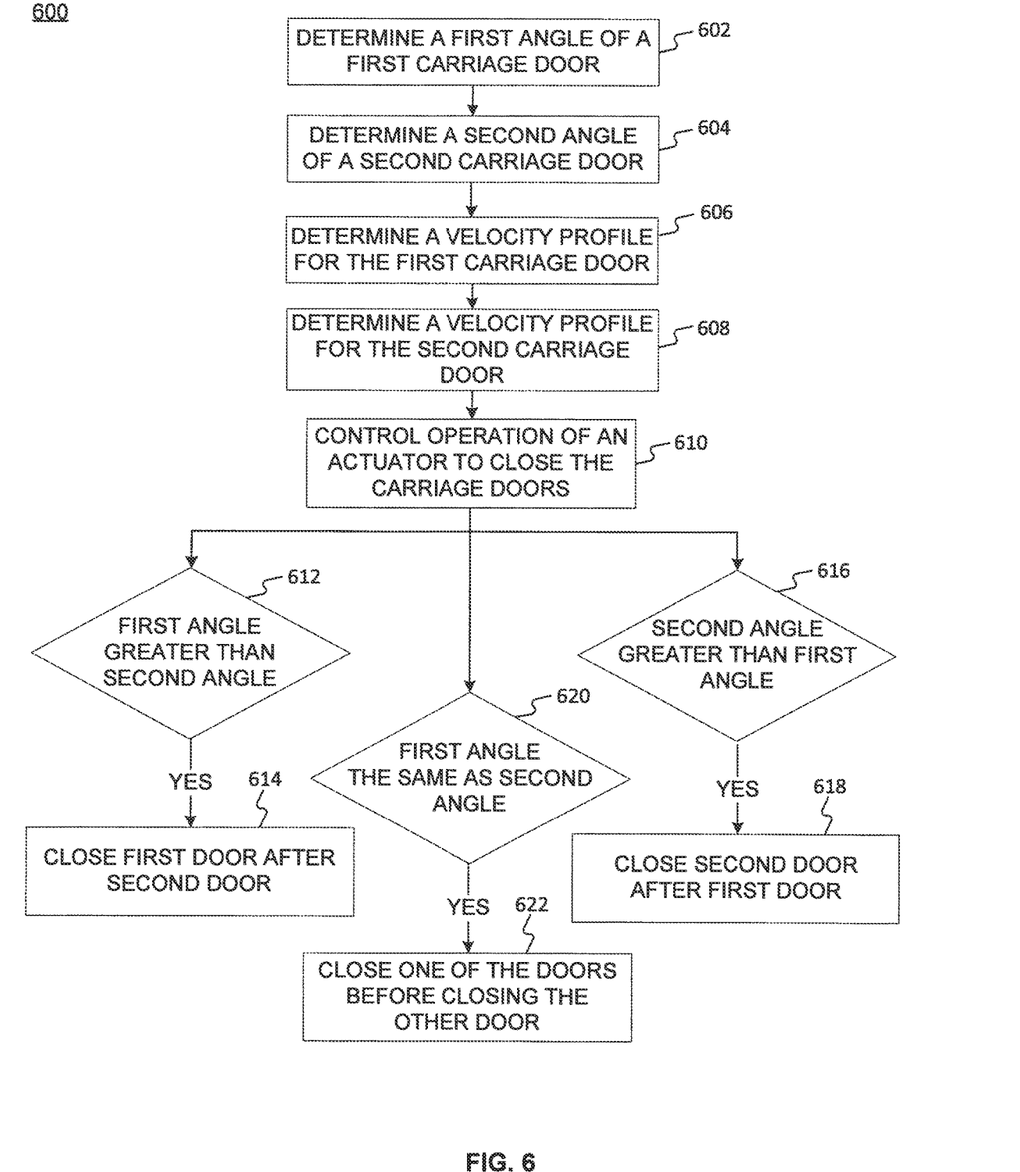
FIG. 6 is a flow chart of an exemplary embodiment of a process that may be performed by the exemplary system of FIG. 1.

FIG. 6 is a flowchart of an exemplary process 600 for closing the carriage doors of a vehicle. At 602, a first angle relative to the side of the vehicle to which a first carriage door is oriented may be determined. The first angle may be determined by a controller, with or without sensors. In some embodiments, sensors may determine the first angle of orientation of a door, which may be front door 206, relative to the side of vehicle 200 on which door 206 is attached. The first angle may be 0, 60, or 90 degrees. In some embodiments, the first angle may be greater than 90 degrees.

At 604, controller 100 may determine a second angle of orientation relative to the side of the vehicle to which a second carriage door is oriented. As with the first angle, the second angle may be determined by a controller, with or without sensors. Similarly, the second door, which may be rear door 208, may open at an angle greater than 90 degrees.

At 606, controller 100 may determine a velocity profile for the first carriage door. The velocity profile for a first carriage door may be generated in the same manner that a velocity profile is generated for doors are hinged at a leading edge of the door. In some embodiments, the velocity profile accounts for the reduction in velocity of at least one of the doors implemented to prevent adjacent edges of the doors from coming within a predetermined threshold distance from one another.

At 608, controller 100 may determine a velocity profile for the second carriage door. The velocity profile for the second carriage door also may be generated in the same manner that a velocity profile is generated for doors that are hinged at a leading edge of the door. In some embodiments, a velocity profile for each of the carriage doors 206 and 208 may be generated without regard for preventing adjacent edges of the doors from coming within a predetermined threshold distance from one another, and then modified to account for the doors potentially coming within a threshold distance from one another while closing. In some embodiments, a velocity profile may be dynamic and change based on the angular position of carriage doors 206 and 208 while closing (e.g., if they come within a particular distance from the threshold distance). In some embodiments, one or more of the velocity profiles may be altered, or may stop being used by a controller to close the doors, for example, when a foreign object (e.g., a person) physically adds resistance to the door while it's closing (e.g., a person physically stops the door or doors from closing).

At 610, controller 100 may control operation of one or more actuators to close the carriage doors. As described above, one or more actuators may open or close carriage doors 206 and 208 based on respective velocity profiles. For example, the velocity profiles may provide the actuators with a speed at which to close carriage doors 206 and 208 when they are at particular angular positions, and may be based on signals received from one or more sensors.

At 612, a determination is made as to whether the first angle associated with the first carriage door is greater than the second angle associated with the second carriage door. For example, a determination may be made as to whether a first door (e.g., front door 206) is opened more than the second door (e.g., rear door 208). If it is determined that the first angle is greater than the second angle, this condition is met (the "YES" arrow out of 612 to 614), and the process may proceed to 614. At 614, the first door is closed after the second door. For example, if front door 206 is opened more than rear door 208, rear door 208 may close first and front door 206 may close after rear door 208. In some embodiments, both carriage doors 206 and 208 may move at a reduced angular velocity when nearing the threshold distance from one another. In some embodiments, a first closing door may move at a velocity less than a velocity at which it would move if the first door was closing and the second door was already closed. In some embodiments, the second closing door may move at a velocity at which it would move if the first door was already closed, when the first door has slowed in velocity to prevent the doors from coming within a predetermined threshold distance from one another.

At 616, a determination is made as to whether the second angle is greater than the first angle. For example, a determination may be made as to whether a second door (e.g., rear door 208) is opened more than a first door (e.g., front door 206). If it is determined that the second angle is greater than the first angle, this condition is met (the "YES" arrow out of 616 to 618), and the process may proceed to 618. At 618, the second door is closed after the first door. For example, if rear door 208 is opened more than front door 206, front door 206 may close first, and rear door 208 may close after front door 206.

At 620, a determination is made as to whether the first angle is the same as the second angle. For example, a determination may be made as to whether a first door (e.g., front door 206) is opened more than a second door (e.g., rear door 208). If it is determined that the first angle is substantially the same as the second angle, this condition is met (the "YES" arrow out of 620 to 622), and the process may proceed to 622. At 622, either the first door or the second door may close first. For example, both doors 206 and 208 may move toward a closed position at a speed that is substantially the same, and when the doors 206 and 208 move near the closed position (e.g., when the distance between the doors is less than three millimeters), front door 206 may slow down or stop, such that rear door 208 may close, and front door 206 and rear door 208 do not become closer than the predetermined threshold distance from one another.

It will be apparent to those skilled in the art that various modifications and variations can be made to the disclosed systems and methods. Other embodiments will be apparent to those skilled in the art from consideration of the specification and practice of the systems and methods. It is intended that the specification and examples be considered as exemplary only, with a true scope being indicated by the following claims and their equivalents.

What is claimed is:

1. A system for closing carriage doors of a vehicle, the system comprising:
   a first carriage door configured to be opened and closed via a first actuator relative to a side of the vehicle on which the first carriage door is attached;
   a second carriage door configured to be opened and closed via a second actuator relative to the side of the vehicle on which the second carriage door is attached; and
   a controller configured to:
      receive signals indicative of a first angle relative to the side of the vehicle at which the first carriage door is oriented;
      receive signals indicative of a second angle relative to the side of the vehicle at which the second carriage door is oriented;
      determine a first velocity profile for the first carriage door based on the first angle and the second angle;
      determine a second velocity profile for the second carriage door based on the first angle and the second angle; and
      control operation of at least one of the first and second actuators based on the first and second angles, such that the first carriage door and the second carriage door stay farther apart from one another than a predetermined threshold distance while closing.

2. The system of claim 1, further comprising at least one sensor communicatively coupled to the controller and configured to send signals indicative of the first angle and the second angle.

3. The system of claim 1, wherein the first carriage door is located closer to a front portion of the vehicle than the second carriage door, and wherein the second carriage door is located closer to a rear portion of the vehicle than the first carriage door.

4. The system of claim 3, wherein the first carriage door closes before the second carriage door to prevent the first carriage door and the second carriage door from being closer to one another than the predetermined threshold distance while closing.

5. The system of claim 3, wherein the second carriage door closes before the first carriage door to prevent the first carriage door and the second carriage door from being closer to one another than the predetermined threshold distance while closing.

6. The system of claim 1, wherein the first carriage door closes before the second carriage door in response to the first angle being less than the second angle.

7. The system of claim 1, wherein the second carriage door closes before the first carriage door in response to the second angle being less than the first angle.

8. The system of claim 1, wherein first carriage door and the second carriage door begin moving toward a closed position at substantially the same speed.

9. The system of claim 8, wherein movement of the first carriage door decreases in velocity relative to a velocity of movement of the second carriage door when the first carriage door and the second carriage door are closing and are less than thirty degrees from the closed position.

10. The system of claim 9, wherein the first carriage door moves into the closed position after the second carriage door has moved into the closed position.

11. A method for closing carriage doors of a vehicle, the method comprising:

receiving, via a controller, signals indicative of a first angle, wherein the first angle is an angle at which a first carriage door is opened relative to a side of the vehicle on which the carriage doors are attached;

receiving, via the controller, signals indicative of a second angle, wherein the second angle is an angle at which a second carriage door is opened relative to the side of the vehicle on which the carriage doors are attached;

determining, via the controller, the first and second angle;

determining, via the controller, a velocity profile for the first carriage door based on the first angle and the second angle;

determining, via the controller, a velocity profile for the second carriage door based on the first angle and the second angle; and controlling, via the controller, operation of at least one of a first actuator configured to open and close the first carriage door relative to the side of the vehicle on which the carriage doors are attached, and a second actuator configured to open and close the second carriage door relative to the side of the vehicle on which the carriage doors are attached, the operation being based on the first and second angles, such that the first carriage door and the second carriage door stay farther apart from one another than a predetermined threshold distance while closing.

12. The method of claim 11, further comprising sending via at least one sensor communicatively coupled to the controller, the signals indicative of the first angle and the signals indicative of the second angle.

13. The method of claim 11, further comprising controlling operation of at least one of the first and second actuators, such that the first carriage door closes before the second carriage door to prevent the first carriage door and the second carriage door from being closer to one another than the predetermined threshold distance while closing.

14. The method of claim 11, further comprising controlling operation of at least one of the first and second actuators, such that the second carriage door closes before the first carriage door to prevent the first carriage door and the second carriage door from being closer to one another than the predetermined threshold distance while closing.

15. The method of claim 11, further comprising controlling operation of at least one of the first and second actuators, such that the first carriage door closes before the second carriage door in response to the first angle being less than the second angle.

16. The method of claim 11, further comprising controlling operation of at least one of the first and second actuators, such that the second carriage door closes before the first carriage door in response to the second angle being less than the first angle.

17. The method of claim 11, further comprising controlling operation of at least one of the first and second actuators, such that the first carriage door and the second carriage door begin moving toward a closed position at substantially the same speed.

18. The method of claim 17, further comprising controlling operation of at least one of the first and second actuators, such that the first carriage door decreases in velocity relative to a velocity of the second carriage door when the first carriage door and the second carriage door are closing and are less than thirty degrees from the closed position.

19. The method of claim 18, further comprising controlling operation of at least one of the first and second actuators, such that the first carriage door moves into the closed position after the second carriage door has moved into the closed position.

* * * * *